Figure 1:
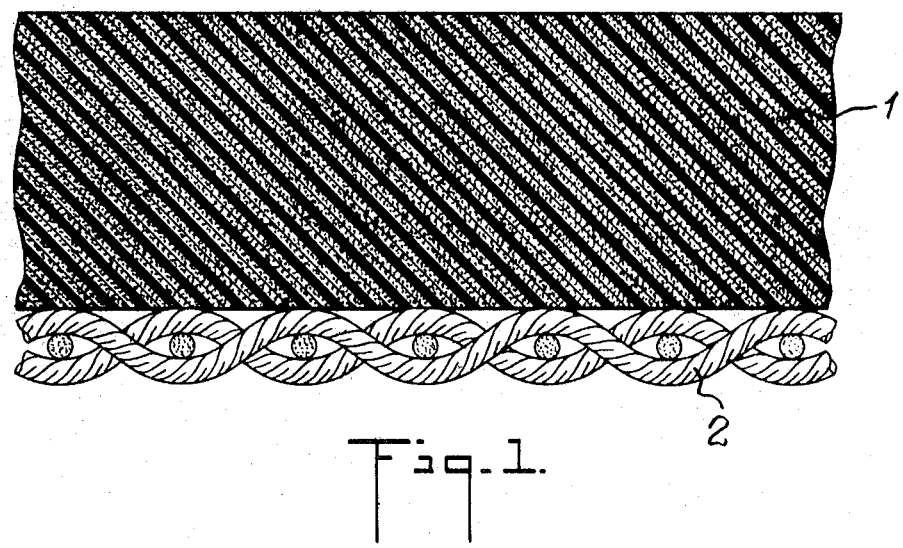

United States Patent

[11] 3,622,432

[72] Inventors: John D. McCluer, Charlotte, N.C.; Robert C. Roy, East Longmeadow, Mass.
[21] Appl. No. 622,859
[22] Filed Feb. 1, 1967
[45] Patented Nov. 23, 1971
[73] Assignee H. K. Porter Company, Inc., Pittsburgh, Pa.
Continuation-in-part of application Ser. No. 364,010, Apr. 30, 1964, now abandoned, which is a continuation-in-part of application Ser. No. 230,983, Oct. 16, 1962, now abandoned, which is a continuation-in-part of application Ser. No. 93,159, Mar. 3, 1961, now Patent No. 3,253,947. This application Feb. 1, 1967, Ser. No. 622,859

[54] FLEXIBLE IONIZING RADIATION SHIELD BARRIERS
9 Claims, 4 Drawing Figs.
[52] U.S. Cl. ............................ 161/87, 156/286, 161/83, 161/158, 250/108
[51] Int. Cl. ............................ G21f 1/10, G21f 3/02, B32b 5/30
[50] Field of Search ............................ 156/285, 286; 161/87, 158, 83, 168, 174; 264/102; 250/108, 108 FS

[56] References Cited
UNITED STATES PATENTS

| | | | |
|---|---|---|---|
| 3,239,669 | 3/1966 | Weinberger | 250/108 |
| 3,065,351 | 11/1962 | Weinberger et al. | 250/108 |
| 3,062,678 | 11/1962 | McCluer | 117/137 X |
| 3,061,491 | 10/1962 | Sherrard et al. | 250/108 X |
| 2,845,660 | 8/1958 | Peiler | 264/102 |
| 2,441,945 | 5/1948 | Frolich et al. | 250/108 X |

OTHER REFERENCES
Marchionna, Butalastic Polymers, 1946, pp. 1008–1011

Primary Examiner—Robert F. Burnett
Assistant Examiner—Litman: Mark A.
Attorney—Ward, McElhannon, Brooks & Fitzpatrick ABSTRACT: Flexible ionizing radiation shield barriers which comprise a heavily lead-loaded elastomeric layer adhering to a fabric base, thereby forming a thick heavy flexible material useful in shielding against radiation. The lead loading comprises at least 55 percent by total weight of the material, and is comprised of lead particles of, at most, 200 mesh.

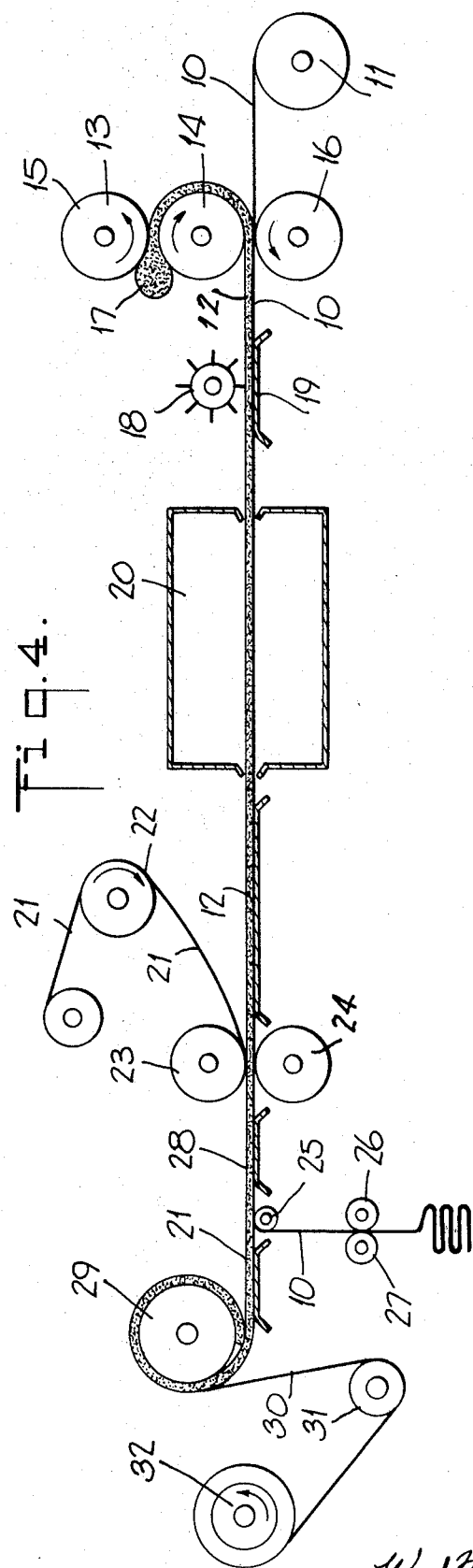
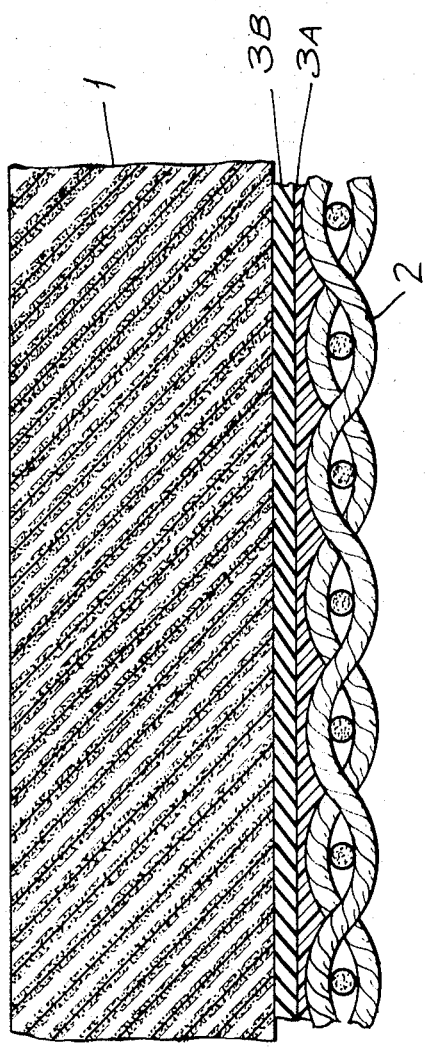

FLEXIBLE IONIZING RADIATION SHIELD BARRIERS

This application is a continuation-in-part of copending application Ser. No. 364,010 filed Apr. 30, 1964 which in turn is a continuation-in-part of copending application Ser. No. 230,983 filed Oct. 16, 1962, both now abandoned which is in turn a continuation-in-part of copending application Ser. No. 93,159 filed Mar. 3, 1961, now Pat. No. 3,253,947.

This invention relates to sheet material useful as a shielding or barrier material to the passage of ionizing radiation and especially high energy gamma radiation and nuclear radiation. More particularly, it relates to flexible radiation barrier material capable of being repeatedly rolled tightly upon itself and unrolled without losing its shape. Specifically, it relates to a laminated barrier material of substantial thickness and carrying substantial amounts of lead.

It is known in the art that ionizing radiation such as gamma radiation produced in X-ray machines, or radiation from nuclear reactions can be substantially or completely attenuated by interposing lead sheeting between the source and the site to be protected. Lead sheeting, however, is not a suitable material where the site to be protected comprises a complex, nonplanar surfaces such as are encountered when it is desired to protect operating personnel, or to block leakage from equipment or the like. Under such circumstances, it is desired to provide sheet material which will conform to the contours of the surface to be protected and be flexible enough to change as the configuration of the surface changes, or as it becomes necessary to utilize the sheeting for various other pieces of equipment.

Unfortunately, it has not been possible to provide sheeting material in which effective radiation protection is provided with desirable flexibility characteristics. In many instances, industry and governments standards for protection have been set forth in terms of minimum thickness of lead sheeting required for essentially complete protection against a stated intensity of radiation at a given distance. The art has had considerable difficulty in providing flexible sheeting material which conforms to these requirements, particularly in the area of secondary radiation, that is stray radiation, leakage and the like. For example, the National Bureau of Standards Handbook, No. 76, issued Feb. 9, 1961 and containing the recommendations of the National Committee on Radiation Protection and Measurements, indicates that under conditions of highest hazards in controlled areas, a one-sixteenth inch sheet of lead is required for secondary shielding against radiation intensity of 150 KVP at a distance of 5 feet. As is known to those skilled in the art, hazard is expressed as the product UT where U, termed the Use Factor, is a measure of the amount of time that a useful beam of radiation is pointed in the direction under consideration, and T, termed the Occupancy Factor, is a measure of the type or degree of occupancy in the area under consideration. Highest hazard is a product equal to one. Using the same intensity of radiation as above, secondary shielding for environs, i.e. surrounding areas, at a UT factor of one requires lead sheeting equal to three thirty-seconds of an inch, while at a UT factor of one-sixteenth, lead sheeting of one-sixteenth of an inch is required. Similarly, the safety code of the American Standards Association for the industrial use of X-rays indicates that lead sheeting of about 0.067 inches i.e. about one-sixteenth of an inch, is required for secondary protective barriers from operations at 10 milliamperes, 150 kv., and 4 feet of distance from source.

As far as is known, there has not been available, heretofore, a flexible sheeting material of the type described above capable of exhibiting barrier characteristics equal to lead sheeting and conforming to the standards set forth by government and industry.

In general, the present invention contemplates novel radiation barrier materials and novel processes for preparing them. In its broadest sense, the barrier material of the present invention comprises a fabric base bearing on at least one surface a lead-loaded elastomeric layer adhering to said base, which layer has dispersed therethrough, in a substantially homogeneous manner, very finely divided powdered lead particles which constitute a physically continuous phase in or throughout the elastomeric layer, the thickness of said loaded elastomer being at least one-eighth inch, the lead-loaded elastomer constituting at least 58 percent by weight of the total weight of the barrier material and the lead constitutes at least 55 percent by weight of the total weight of said barrier material.

The lead is in the form of a powder of a particle sizes less than that which will pass through a 200 mesh Tyler screen, and preferably of a particle size 100 percent of which will pass through 325 mesh Tyler screen. The particles of lead powder dispersed in the elastomer layer are substantially nonagglomerated but are generally in contact with one another and the layer is of sufficient thickness that the lead particles constitute a physically continuous phase therein, although this continuous relationship may not be in one plane. The term "physically continuous phase" as employed herein is to be understood as defining the situation existing in the elastomeric layer by reason of lead powder continuity therein, whereby an X-ray photograph taken through the material product of the present invention is unexposed or clear, thus indicating complete screening of the X-rays. A similar X-ray plate of material, in which the lead particles are of a larger size and discontinuously dispersed through the elastomer exhibits a peppered effect indicating X-ray permeable areas throughout the material as a result of the discontinuity of the granular lead in the elastomeric film thereof. From the standpoint of X-ray analysis, the continuous powdered lead phase of the product of the present invention is substantially the same as a sheet of lead. Actually, the preferred barriers of the present invention, as more particularly described hereinafter, are equivalent in ray attenuation to lead sheeting greater than one-sixteenth of an inch thick.

Although the foregoing definition relates to low energy X-rays, it should be understood that the products of this invention are useful not only to shield against gamma radiation but also, because of the large amounts of lead which are incorporated in the sheet, are effective against high energy radiation. No flexible, drapeable material has yet been described which contains sufficient lead to afford production against high energy radiation. In fact, lead sheeting constitutes the most common material now used for such protection.

The radiation barriers of the present invention preferably comprise from 2 to 10 and most preferably from 3 to 6 percent by weight of the underlying fabric base, from 3 to 15 and most preferably from 4 to 10 per cent by weight of the elastomer and from 55 to 95 and most preferably 75 to 90 per cent by weight of the lead, all based on the total weight of the barrier. The lead-loaded elastomer therefore preferably contains more than 77 per cent by weight of lead and most preferably from 87 to 97 per cent by weight. When amounts of lead are employed at the lower end of the range indicated, the remainder of the mix is generally taken up by adjuvants, fillers and the like normally used in the art and, as will be apparent hereafter, preferably by quantities of a dispersing agent. It will be appreciated that such amounts of lead are significantly higher than those achieved heretofore and results in a heavily loaded, extremely effective barrier. In this regard, the radiation barrier of the invention will generally weigh more than about 2.5 lbs./ft.$^2$, usually between 2.5 and 7.5 lbs./ft.$^2$ and preferably from 4.8 to 5.6 lbs./ft.$^2$. On an ounce per square yard basis this conforms to greater than 360 oz./yd.$^2$, usually between 360 and 1050 oz./yd.$^2$ and preferably 690 to 870 oz./yd.$^2$. The lead-loaded elastomer will generally constitute between about 58 to 98 and preferably from 79 to 94 per cent of this weight.

As noted previously, the lead-loaded elastomer layer on the barriers of the invention is at least 0.125 inches thick and preferably from 0.20 to 0.50 inches. Such a product is equivalent in terms of radiation protection, to a lead sheet having a thickness of one-sixteenth of an inch or more and usually greater than five sixty-fourths of an inch. Such a product has not been known or described heretofore.

In a preferred aspect of the invention, the lead-loaded elastomer layer also contains a quantity of a dispersing agent to aid in the uniform dispersion of the lead particles throughout the elastomer. When employed, suitable results are obtained when the dispersing agent is used in amounts ranging from about 0.5 to 20 and preferably 5 to 15 weight per cent based on the weight of the elastomer alone. A wide variety of dispersing agents may be employed including for example, the sulfonated fatty acid esters, dioctyl sodium sulfosuccinate, alkyl aryl sulfonates, monoethanolamine, alkyl aryl polyether alcohols, and the like.

The fabric portion of the present product serves as a flexible support and reinforcing means for the elastomeric film containing the dispersed lead powder. The fabric renders the product substantially self-supporting, thus enabling its use in a variety of intricate designs and hence the thickness thereof is important only as it bears on the mechanical properties of the final barrier material. Various fabrics may be used to compensate for conditions that exist in particular surroundings in which the barrier material of the present invention may be employed. For example, an asbestos base cloth would be used where the fabric support is desired to be flame retardant or where thermal insulation is desired coincidental with radiation protection. Other fibers such as jute, hemp, cotton, wool or the synthetics such as nylon, glass, etc., as well as hardware cloth, that is screening or cloth composed of fine wires, or a combination of wire plied with woven asbestos or other fiber, may be employed as the base fabric. The term "fabric" as employed herein is intended to include woven, knit or felted goods of the aforementioned materials.

A preferred flexible fabric support is an asbestos-base fabric, which term as employed herein is intended to define a fabric containing at least about 50 percent by weight asbestos fibers. A typical woven asbestos-base fabric eminently well suited for the product of the present invention is one containing about 83 percent asbestos and the balance other fibers, for example cotton. Such a material may be flameproofed in accordance with McCluer U.S. Pat. Nos. 2,884,343 and 2,948,641, or the fabric may be rendered flameproof and water-repellent as disclosed in McCluer U.S. Pat. No. 3,062,678 which issued Nov. 6, 1962. Flame-proofing and water-repellent properties are desirable for most marine applications, and in many instances these preliminary treatments of the fabric support will be mandatory for fabric life and environmental safety. Since the preferred fabric is an asbestos-base cloth, the present invention will be further described with specific reference to this type of support or base. The presence of boron in the flame retardants of the aforementioned patents is especially useful since this element captures neutrons without producing high energy gamma rays.

The elastomer which serves as supporting carrier for the powdered lead is a polymer, for example rubber, or latex, or one of the synthetic elastomers. While the primary function of this elastomeric layer is to hold the dispersed lead powder in position, it is by its nature also a water-repellent vapor-barrier material. The elastomer is preferably a cured vinyl polymer. The term "vinyl" as employed herein is intended to designate those polymers containing the ($CH_2$:CH—) radical and as such also includes derivatives of acrylic acid. Materials of this class which also contain an attached chlorine atom are preferred since chlorine imparts a degree of flame retardancy to the layer. A preferred elastomer is 2-chloro butadiene-1,3, known as neoprene. When fully polymerized, neoprene is highly resistant to acid and most corrosive chemicals including hydraulic fluids, and is also flexible over a wide range of temperatures, as are other preferred vinyl elastomers which may be employed.

In addition to neoprene other suitable elastomeric materials include vinyl chloride polymer, the copolymer of butadiene and acrylonitrile, preferably copolymerized in the ratio of about 55:45, vinyl acetate polymer, vinyl butyrate polymer, the copolymer of vinyl toluene with butadiene, as well as polymers or copolymers of methyl, ethyl or butyl acrylate, each of which contains a $CH_2$:CH— group, and mixtures thereof and the copolymers of butadiene and styrene, commonly known as GRS rubber. The above are representative only of a wide variety of suitable elastomers.

In addition to the above elastomers, the well-known polyurethane foams may also be employed as the carrier for the lead powder, as described in U.S. Pat. No. 3,253,947.

The products of the present invention are prepared by a novel process surprisingly discovered to be capable of forming a highly lead-loaded elastomeric barrier material of substantial thickness. Because of the relatively large amounts of lead in the products of this invention, conventional methods such as dip coating or knife coating are unsatisfactory. In general, the method involved herein contemplates forming a solid homogeneous mixture of the elastomer in raw form with the lead by intimately dispersing the lead throughout the elastomeric matrix, preferably with the aid of dispersing agents as aforementioned. The mixing is conveniently achieved on a rubber mill at slightly raised temperatures. The solid mixture or blend is then applied to the fabric base by delivering the blend through a roller system adjusted to a bite size corresponding to the thickness of lead-loaded elastomer layer desired in the final barrier product. Adherence to the fabric layer is conveniently achieved by precoating the fabric base with an adhesive material which may be a rubbery elastomeric material developing adhesive characteristics at elevated temperatures. The lead-loaded elastomer is next preferably subjected to a needling operation whereby a plurality of thin punching needles are directed into the elastomeric layer so as to provide channels for escaping air when submitted to a subsequent vacuum treatment, a preferred step. This aids in preventing blisters during the curing operation. Needling devices normally employed in such art are suitable in this phase of the operation. It is preferred thereafter to subject the needled layer to a vacuum treatment to aid further in the release of air prior to vulcanization or curing. Thereafter the entire structure is subjected to vulcanization conditions to vulcanize the elastomeric layer. This is conveniently achieved in a steam autoclaving system using gradually increasing temperatures until the final vulcanization temperature is reached. For neoprene this is conveniently in the range of 280° to 310° F. By gradual increase in temperature is meant those conditions for approaching and reaching curing temperatures which do not cause substantial blistering of the layer. For neoprene, increments of 30°–50° F. every 30 minutes up to about 250° F, with longer periods of the order of an hour being used above 250° F are suitable. The resulting structure is thereafter cooled and is ready for use as desired.

In a preferred mode of operation, a prime coat is first applied to the base fabric followed by a flame proofing treatment. The prime coating forms part of the adhesive means for adhering the lead-elastomeric layer to the fabric and is a material capable of developing adhesive properties. It is applied first so as to provide better adhesion to the fabric surface by coating the loose fibers thereof. The flame proofing would have a tendency to smooth down and destroy the fluffy nature of the fibers in the cloth if it were done first in which case the fibers would not present as much surface area for the prime coat to contact. Also, prewetting the fabric even though dried, destroys to a degree, the absorbency of the fibers. It is preferred that the prime coat be put on only one side of the fabric rather than both sides, so that the uncoated side may absorb enough flame proofing compound to render the prime coated fabric essentially completely flameproof. Similarly, where no prime coat is used, i.e. where the loaded elastomer is secured directly to the fabric, flameproofing, if desired, can be performed after application of the loaded stock to the fabric.

The prime coat is preferably neoprene and is applied as an emulsion in any convenient manner such as by roller coating. The flameproofing operation is conveniently performed as described in McCluer U.S. Pat. No. 2,948,641. It is preferred to follow this with the application of a dissimilar rubber, again one which is capable of developing adhesive properties, preferably butyl rubber, to the neoprene prime coat. Better bonds are obtained between the fabric and the lead-loaded elastomer layer by utilizing alternate layers of unlike rubbers as the adhesive means. This is especially so when neoprene is used as the loaded elastomer. There appears to be a better adhesion between neoprene and butyl rubbers than between neoprene and neoprene. After the coat of butyl rubber has been applied and dried, it is preferred, for ease of mechanical operation, to interleaf the fabric as it is rolled up from the drying process with a protective film of plastic such as polyethylene or the like to prevent sticking in the roll. The butyl rubber compound is inherently tacky so that interleafing is highly desirable. The pretreated fabric is then ready for application thereto of the lead-loaded elastomer.

As stated above, the lead-loaded-elastomer, preferably neoprene, is applied as a solid mixture. It has been found that this allows the application of a very heavy coating of lead loaded neoprene to the fabric yielding a product weighing up to 7.5 lbs./ft.$^2$ and more, and that this coating can be applied as one coat rather than in a multiple number of thin coats. It also allows formation of a product relatively free of air pockets or blisters.

The lead-loaded neoprene mixture is conveniently prepared by first blending the neoprene rubber with all the desired additives on a Banbury Mixer. Additives such as antioxidants, pigments, vulcanizing agents, lubrication agents, plasticizers dispersing agents and the like may be employed. The solid mix thus obtained is then blended, preferably on a two-roll rubber mill, with the lead particles. The lead constitutes many times the weight of the elastomer and, as stated hereinabove, is blended into the neoprene in amounts sufficient to constitute preferably greater than about 77 percent by weight of the total loaded elastomer weight. This blended stock then constitutes the mix to be used as the final coat. This together with the base cloth with all preliminary coatings and treatments, preferably after being allowed to come into equilibrium with the ambient conditions, are then ready for processing to form the barrier of the invention.

Figure 2:
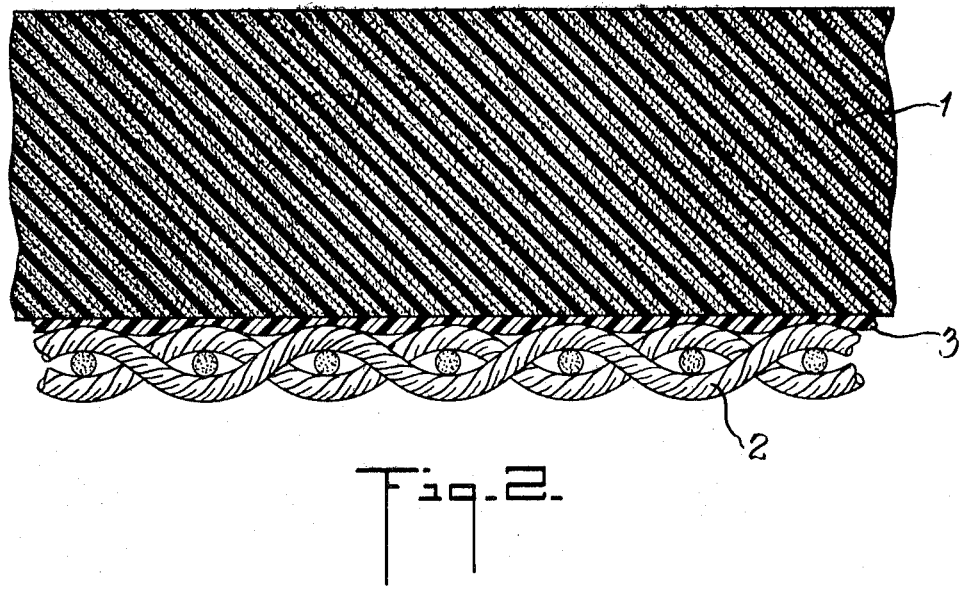

A suitable method for applying the lead-loaded elastomer to the treated fabric base will now be described with particular reference to the drawings wherein: FIGS. 1, 2 and 3 show exaggerated cross-sectional views of different embodiments of the products of the invention and FIG. 4 is representative of a suitable scheme for applying the lead-loaded elastomer to a fabric base. More particularly, FIG. 1 shows the product of the invention wherein the lead-loaded elastomer 1 is directly adhered to fabric base 2. FIG. 2 shows an adhesive layer 3 intermediate said elastomer layer 1 and said fabric 2 and providing adhering means therebetween. FIG. 3 depicts the product of the invention wherein adhesive layer 3 is made up of two dissimilar elastomer bonding layers 3A and 3B being preferably a neoprene prime coat 3A and a butyl top coat 3B.

Referring now to FIG. 4, a roll of scrim cloth 10, suitably of cotton or rayon is mounted on roller 11 behind calender 15. The scrim is desirably the same width as the intended finished product. The milled stock of lead loaded neoprene rubber compound 17 is fed into the calender between the top and middle rolls 13 and 14 on the front side with the bite between the rolls adjusted for the desired thickness of coating. A convenient means of determining the proper thickness is to relate the same back to the weight of a predetermined area of material around roll 14. For example, when a coating of compound has built up around the middle roll 14 of approximately the right thickness, one half square foot is cut out and weighed. Any adjustment in this weight of coating is made by changing the bite between rolls 13 and 14. When this adjustment has been made for the proper weight per square foot of coating, the scrim cloth 10 is fed in between the middle and bottom rolls 14 and 16 and there receives loaded elastomer layer 12. The coated cloth rides over a smooth table 19 at which point a roller with sharp pointed spikes 18 revolves, punching tiny holes in layer 12. The cloth next passes through a vacuum chamber 20 where any air within the layer will be withdrawn, being released through the tiny holes. On exiting from the vacuum chamber, the elastomer layer 12 is brought into contact with the precoated and treated fabric 21 fed from roll 22. Contact is made between rollers 23 and 24 where the treated side of fabric 21 is brought into contact with the layer 12. The rollers 23 and 24 calendar the two to make excellent contact of the butyl coating (not shown) of treated fabric 21 with the lead loaded neoprene layer 12. After passing through rollers 23 and 24 the scrim cloth 10 is stripped off over roller 25 by revolving rollers 26 and 27. The layered fabric structure 28 comprising fabric 21 and layer 12 is interleafed on the elastomer side with a rayon interliner 30 well dusted with zinc stearate and then rolled up under tension which keeps the coating firm and prevents absorption of any air. The rayon liner is fed from roll 32 which has a friction brake to apply pressure on the coated cloth. After leaving roll 32, rayon liner 30 passes over a sectional spread roller 31 to remove all wrinkles which would otherwise place indentations in the coating.

Thereafter, using conventional techniques, the rayon interliner is stripped off the roll of lead loaded neoprene and simultaneously a butyl rubber liner is interleafed in the roll. The entire roll is wrapped under high tension around the outside thereof with a multiple of turns of a nylon liner. The wrapped roll is then ready for vulcanization in standard type vulcanization equipment, preferably a steam autoclave vulcanizer. After cure, the nylon outer liner, and butyl interliner are rolled off and the finished product used as desired.

The following examples are given for purposes of illustration.

EXAMPLES

Example 1. An asbestos base fabric material is prime coated using roller coating equipment with a neoprene elastomeric system (Formulation A):

| Formulation A | Parts by Weight |
| --- | --- |
| 2-Chloro butadiene-1,3 (Neoprene) 40% Aqueous Emulsion | 100 |
| Antimony Oxide (Flame Retardant) | 3 |

Thereafter, a butyl rubber adhesive coat is applied by roller coating in the form of an aqueous emulsion (Formulation B) over the neoprene prime coat to form together therewith an adhesive means for subsequent bonding of the loaded elastomer to the fabric.

| Formulation B | Parts by Weight |
| --- | --- |
| Butyl Rubber 40% Aqueous Emulsion | 100 |
| Chlorowax (Diamond Alkali Co.) (Flame Retardant) | 5 |

The thus coated fabric is then dried at about 300° F, interleafed with a polyethylene liner and rolled up for use in the next stage of the process, i.e. the application of the lead loaded neoprene thereto.

The following ingredients are selected:

| Formulation C | Parts by Weight |
| --- | --- |
| 2-Chloro butadiene-1,3 Lumps (Neoprene) | 100 |
| Aerosol alkyl aryl sulfonate (dispersing agent) | 2 |
| Lead Powder (325 and finer mesh) Retardant) | 800 |
| Antimony trioxide (Flame Retardant) | 15 |
| MgO | 4 |

| | |
|---|---|
| ZnO | 5 |
| Cotton seed fatty acid | 2 |
| Na22 (accelerator) | 0.5 |
| Hard Clay | 50 |
| Butyl oleate (plasticizer) 20 | |
| Niozone A (antioxidant) | 2 |

All the above ingredients with the exception of the lead powder are intimately blended in a Banbury Mixer. The resulting rubbery master batch is then milled on a two roll rubber mill with the lead powder, the latter being intimately dispersed therethrough during the milling. An ionizing radiation barrier material is then prepared following the description given above with reference to FIG. 4. The procedure is followed setting the bite between rollers 13 and 14 so as to obtain a loaded elastomer layer about one-quarter of an inch thick.

After preparation, the rolled coated fabric is then cured in a steam autoclave. The curing is accomplished by gradually raising the temperature through a curing cycle as follows:

30 minutes at 150° F,
30 minutes at 200° F,
60 minutes at 250° F,
2 hours for final cure at 290° F.

X-ray analyses are conducted on the heavy coated fabric described above and the shielding effect of the material is compared with a one-sixteenth inch sheet of lead metal. The source of radiation is a Westinghouse deep therapy machine operated at 250 kv., 15 MA, with an added filter of one-half mm. of copper and one mm. of aluminum giving a half-value layer of 1.62 mm. of copper. A piece of nonscreen film is placed under the sample and the machine is operated for three seconds to give an output of 4 roentgens in that time, or an equivalent of 80 roentgens per minute. The X-ray film demonstrates that the lead dispersion in the material is completely homogeneous, indicating a continuous lead phase in the elastomeric layer portion of the product.

Measurements are then made with a Victoreen Roentgen Meter, using the same factors described above, except that a one-sixteenth inch sheet of lead is placed under the treatment opening and the meter substituted for X-ray film. Serial examination is made which demonstrates that the output of the machine is diminished by the lead sheet from 80r per minute to 5r per minute.

A similar comparison is made using one-eighth inch thick lead sheet which further decreases the output of 80r per minute to 1r per minute.

Finally, the aforementioned product of the present invention is tested in the same manner as the lead sheets and the output is decreased from 80r per minute to 4.5r per minute.

Accordingly, the protection afforded by the barrier material of the present invention is slightly better than a lead sheet one-sixth inch thick, and is, of course, much more flexible and easier to handle than sheet lead.

The same test is conducted with the same barrier material as above described but the material is doubled upon itself. Thus two layers of the material are interposed between the X-ray source and the Roentgen meter. In this instance the output of the machine is reduced from 80r per minute to 1.2r per minute, or roughly equivalent to the shielding ability of the one-eighth inch lead sheet.

The material of the present invention is thus not only an excellent ionizing radiation barrier, but as noted above, it is very flexible and easily rolled up or draped over any odd-shaped framework. Its reinforcement by the fabric portion lends tear and abrasion resistance to the material. Furthermore, the product is practically punctureproof and is not easily dented, in contrast with a solid lead sheet which is rigid and is easily dented and punctured.

The novel material is useful as secondary shielding behind a main barrier surrounding a nuclear reactor or other radiation source, or for fall-out shelters or doorways, partitions between two parts of a room, as in laboratories, or wherever quick emergency shielding is required. The present product may be used in place of solid material such as sheet lead of comparable thickness and does not have the many disadvantages of such a solid. For example, it is not easily dented or punctured.

Example 2. Similar results are obtained when the procedure of example 1 is repeated using any of Formulation D for the prime adhesive coating, Formulation E for the second adhesive coating or Formulation F or G as the lead loaded elastomer.

| Formulation D | Parts by Weight |
|---|---|
| Butadiene Copolymer 45% Aqueous Emulsion | 100 |
| Chlorowax (Diamond Alkali) Flame Retardant | 5 |
| Formulation E | |
| Chloro Butyl Rubber 40% Aqueous Emulsion | 100 |
| Chlorowax (Diamond Alkali) (Flame Retardant) | 2 |
| Formulation F | |
| 2-Chloro butadiene-1,3 lumps (Neoprene) | 100 |
| Lead Powder (325 mesh) | 800 |
| Monoethanolamine (Dispersing agent) | 2.5 |
| Diphenyl chloride (Flame Retardant) 18 | |
| Trioctyl phosphate (plasticizer) | 22 |
| Wingstay 100 antioxidant | 2.5 |
| Permalux (accelerator) | 0.5 |
| Formulation G | |
| Polymer of polyvinyl chloride (Geon) | 100 |
| Lead Powder (325 mesh) | 800 |
| Emulphor ON870 (dispersing agent) | 3 |
| Antimony trioxide (Flame Retardant) | 20 |
| Butyl benzyl phthalate (plasticizer) | 18 |
| Naugawhite (antioxidant) | 3 |
| Thiouram (accelerator) | 0.5 |

What is claimed is:

1. A flexible material weighing between 2.5 and 7.5 lbs./sq. foot comprising a fabric base, and lead-loaded elastomeric layer adhering to at least one surface of said base, said layer having continuously dispersed therethrough lead particles of a size smaller than 200 mesh, the lead constituting at least 55 percent by weight of the total weight of said material, said lead-loaded elastomeric layer having a thickness of at least 0.125 inches and constituting at least 58 percent by weight of the total weight of said material.

2. The material of claim 1 wherein the fabric base constitutes from 2 to 10 percent by weight, the elastomer constitutes from 3 to 15 percent by weight, and the lead constitutes from 55 to 95 percent by weight, all based on the total weight of the barrier.

3. The material of claim 1 wherein an intermediate adhesive layer is present between said fabric and said elastomer.

4. The material of claim 3 wherein the elastomer of said lead-loaded elastomer is a synthetic vinyl polymer.

5. The material of claim 4 wherein said elastomer is formed from 2-chloro-butadiene-1,3.

6. The material of claim 4 wherein said lead-loaded elastomeric layer comprises from about 0.5 to about 20 percent by weight of a lead powder dispersing agent, based on the weight of said elastomer alone.

7. The barrier of claim 6 wherein the total thickness of the lead-loaded elastomeric layer is from 0.2 to 0.5 inches.

8. The barrier of claim 7 wherein the elastomer is formed from 2-chloro-butadiene-1,3.

9. The barrier of claim 8 wherein the fabric is an asbestos-base fabric and the adhesive layer comprises a first elastomeric layer formed from 2-chloro-butadiene-1,3 adhering to said fabric and a butyl rubber layer adhering to said first elastomeric layer and said lead-loaded elastomer.

\* \* \* \* \*

PO-1050
(5/69)

UNITED STATES PATENT OFFICE
CERTIFICATE OF CORRECTION

Patent No. 3,622,432            Dated November 23, 1971

Inventor(s) JOHN D. McCLUER and ROBERT C. ROY

It is certified that error appears in the above-identified patent and that said Letters Patent are hereby corrected as shown below:

Column 6, under Formulation C , after "mesh", insert
          in the column "Parts by Weight" --800--
          Delete next line "Retardant) 800"

Column 7, under Formulation C, after "Butyl oleate
          (plasticizer) delete 20 where it appears
          and align --20-- in column under "Parts by Weight"

Column 8, line 25 after "Diphenyl chloride (Flame
          Retardant) delete "18" where it appears
          and align --18-- in column under "Parts by Weight"

Signed and sealed this 28th day of November 1972.

(SEAL)
Attest:

EDWARD M. FLETCHER, JR.            ROBERT GOTTSCHALK
Attesting Officer                    Commissioner of Patents